May 18, 1943  H. F. CLARK  2,319,490
SPLIT-PHASE MOTOR CONTROL
Filed Jan. 28, 1941  2 Sheets-Sheet 1
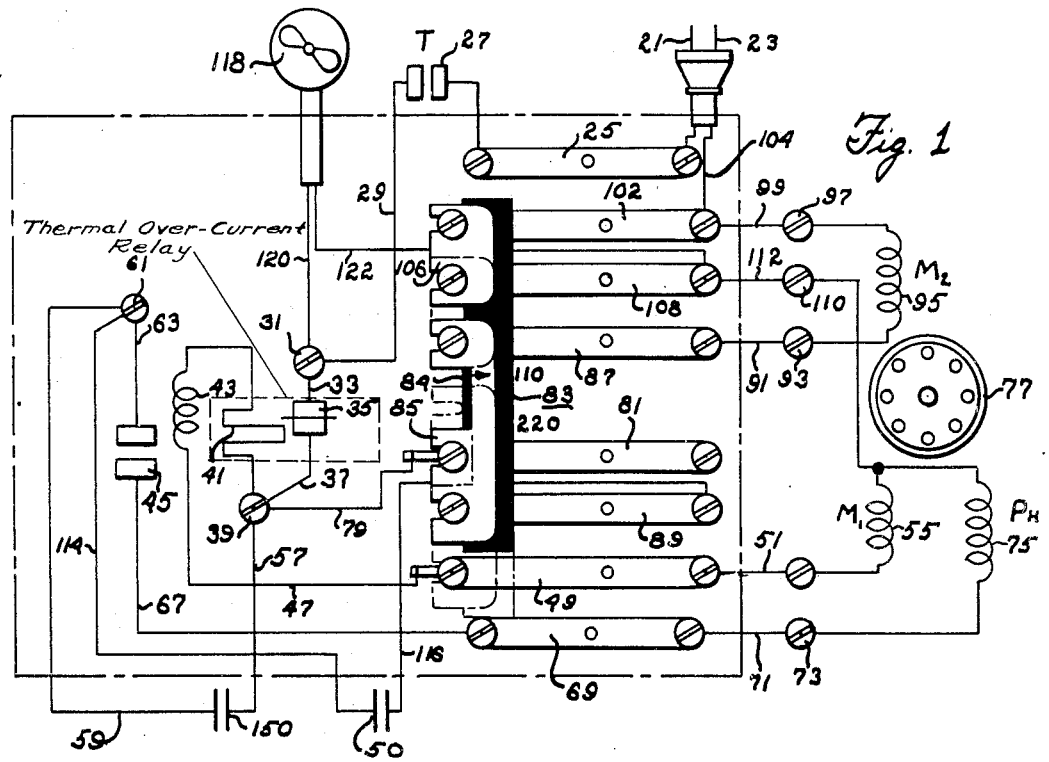
Fig. 1
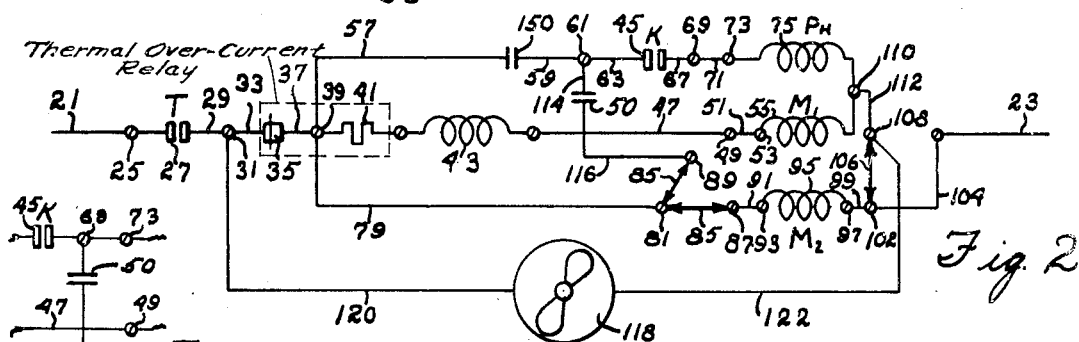
Fig. 2
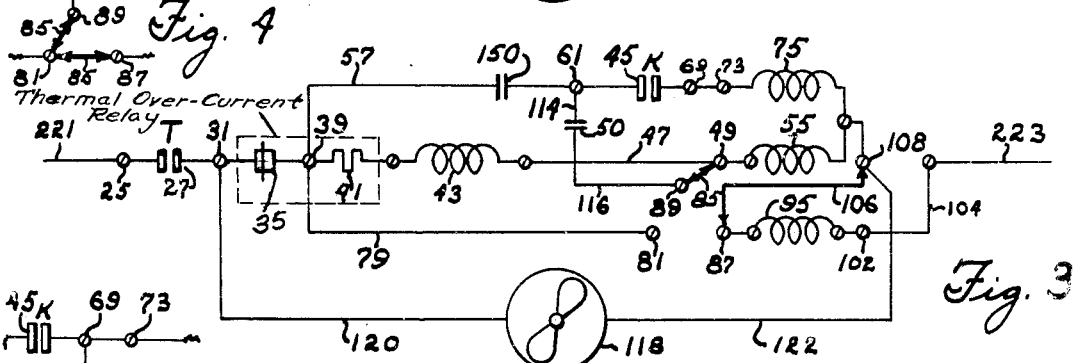
Fig. 3
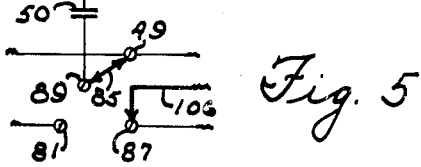
Fig. 4
Fig. 5
INVENTOR.
Harry F Clark
BY Spencer Hardman and Fehr
Attorneys

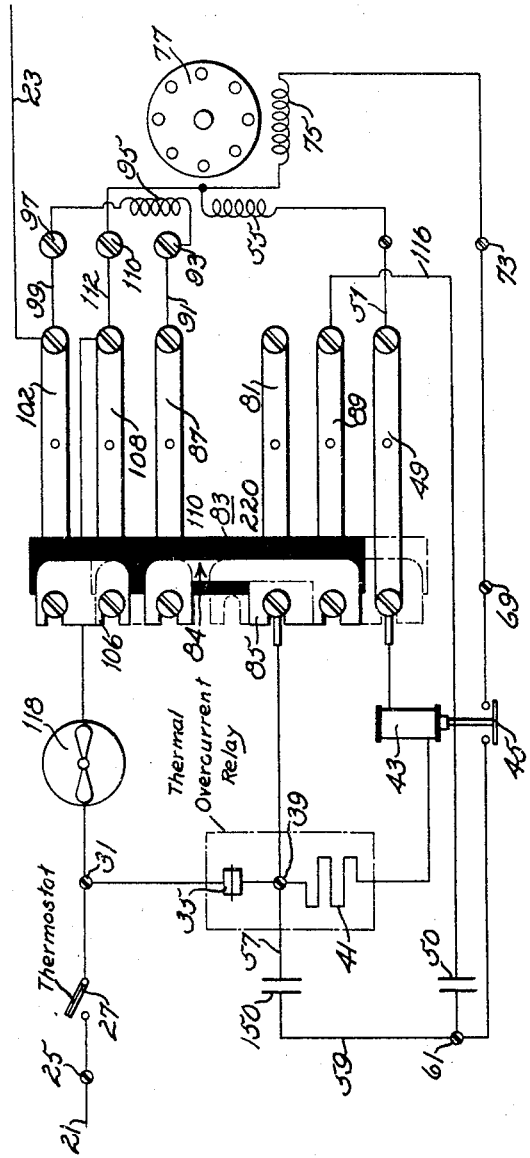

Patented May 18, 1943

2,319,490

UNITED STATES PATENT OFFICE 2,319,490

SPLIT-PHASE MOTOR CONTROL

Harry F. Clark, Oakwood, Ohio, assignor to General Motors Corporation, Dayton, Ohio, a corporation of Delaware Application January 28, 1941, Serial No. 376,353

8 Claims. (Cl. 172—278)

This invention relates to refrigerating apparatus and more particularly to electric motor and control systems for portable apparatus.

Portable electrically driven equipment, for example portable beverage coolers, are often moved from one section to another which have different types of electrical power supply. While motors have been made to operate upon different power sources the magnetic relays used do not operate properly upon the different power sources and it is necessary to change relays when changing from one power source to another. This is also true in connection with certain types of overload controls.

It is an object of my invention to provide an improved electric motor and control system having the magnetic starting relay which can be used upon different power sources by a simple change in connections which can be performed by any serviceman.

It is another object of my invention to provide an electric motor and control system of the capacitor type in which the capacitor means are so arranged that the current through the starting control and/or the overload control is substantially the same for one power source as another.

Further objects and advantages of the present invention will be apparent from the following description, reference being had to the accompanying drawings, wherein a preferred form of the present invention is clearly shown.

In the drawings:

Fig. 1 is a view partly diagrammatic of an electric motor and control system including a connecting means embodying one form of my invention;

Fig. 2 is a wiring diagram showing the electric motor and control system connected for a 110 volt power source;

Fig. 3 is a wiring diagram of the electric motor and control system properly connected to a 220 volt power source;

Fig. 4 is a fragmentary view showing a modification of a portion of Fig. 2; and

Fig. 5 is a fragmentary view showing a modification of a portion of Fig. 3.

Fig. 6 is a further diagrammatic representation of the apparatus shown in Fig. 1.

Briefly, I have shown an electric motor and control system in which the capacitor means is split into two parts so that upon the higher voltage the one capacitor means feeds additional current through the starting relay and overload control so that the current conditions are made substantially the same as for operation upon the lower voltage. A simple electrical connector, shaped like a comb, is used for changing the capacitor connections as well as the motor connections to rearrange each for higher or lower voltages.

Referring now more particularly to Fig. 2 there is shown at either end of the figure the source conductors 21 and 23 which supply 110 volt current. The conductor 21 connects to a terminal connection 25 which in turn connects to a thermostatic switch shown diagrammatically as a set of contacts 27. These contacts are connected by conductor 29 to a terminal connection 31. From the terminal connection 31 the conductor 33 connects to a set of overload contacts 35 which in turn are connected by the conductor 37 to a terminal 39.

This terminal 39 connects to a small electric heater 41 which serves as the actuating element for the normally closed overload contacts so that when an excessive amount of current flows through the electric heater 41 a bimetal or other suitable means will be heated to open the contacts 35. Such overload devices both of the automatic and manual reset type are common and well-known in the art and any such device may be used. The overload heater 41 then connects to an electromagnetic actuating coil 43 for closing the normally open starting relay contacts 45. This relay coil 43 is connected by the conductor 47 to the terminal 49. This terminal 49 is in turn connected by the conductor 51 to the terminal 53 which in turn connects to one section 55 of the main winding of the motor.

The terminal 39 is also connected by a conductor 57 to a capacitor means 150 which in turn is connected by the conductor 59 to a terminal 61. This terminal 61 is connected by the conductor 63 to the starting relay contacts 45 which in turn are connected by the conductor 67 to the terminal 69. This terminal 69 in turn is connected by the conductor 71 to the terminal 73 which in turn is connected to the phase winding 75 of the electric motor 77. This phase winding 75 and the first section of the main winding 55 have a common junction connected to the terminal 110 which in turn is connected by the conductor 112 to the terminal 108.

The terminal 39 is also connected by a third conductor 79 to a terminal 81. When the motor 77 is connected to a 110 volt power source as is shown in Fig. 2, an electrical connector bar 83 is located and connected as shown in Fig. 1. This bar includes a structural section 84 of insulating material and provides a first electrical connector 85 connecting the terminal 81 with the terminals 87 and 89. The terminal 87 is connected by the conductor 91 with the terminal 93 which in turn connects to the second section 95 of the main winding. This second section 95 of the main winding connects to a terminal 97 in turn connected by the conductor 99 to the terminal 102. This terminal 102 in turn is connected by the conductor 104 to the conductor 23 of the power source. The connector bar 83 is provided with a second electrical connector 106 which connects the terminal 102 with a terminal 108. This second connector 106 is structurally connected to the first connector 85 by the structural connection 84 of insulating material.

It was found that this system operated satisfactorily upon 110 volts when so connected. It was found, however, when the system was connected to terminals 221 and 223, providing a power source of 220 volts, that the current through the starting relay coil 43 dropped off considerably, in an amount which prohibited the use of the same magnetic relay. In order to overcome this difficulty I reduce the capacity of the capacitor means 150 located in series with the phase winding 75 and introduced a second capacitor means 50 for providing additional current through the starting relay coil 43 when connected upon the 220 volt power source without changing the total capacitance. In order to do this I connect the additional or second capacitor means 50 across two points of substantially equal voltage, one in the phase winding circuit and the other in one of the main winding circuits. When operating upon 110 volts, the circuit of the section of the main winding, which does not include the starting relay actuating coil, is the one chosen for a second point. However, for operation upon 220 volts this second point is in the circuit in which the starting relay actuating coil 43 is located so that the phase winding current is divided in proportion to the capacities of the two capacitor means 150 and 50 so that the added current flows through the starting relay actuating coil 43. For this purpose, the capacitor means 50 has a conductor 114 connecting to the terminal 61 and a conductor 116 connecting to the terminal 89. The first connector 85 in the 110 volt position thus connects the capacitor means 50 to the terminal 61 on the phase winding circuit and to the terminal 81 in the main winding circuit of the section 95 when operating on 110 volts.

In order to operate upon 220 volts, the electrical connector bar 83 is moved downwardly one notch so that the second electrical connector 106 now connects the terminals 108 and 87, and the first electrical connector 85 now connects the terminals 89 and 49. This places the section 95 of the main winding in series with the other two windings, the main winding section 55 and the phase winding 75, while the main winding section 55 and the phase winding section 75 remain in parallel with each other. This also connects the capacitor means 50 across the terminals 61 in the phase winding circuit and the terminal 53 in the circuit of the main winding section 55 and the starting relay actuating coil 43. By so doing an amount of the phase winding current is diverted through the starting relay actuating coil 43 so that its current vs. motor R. P. M. curve is substantially the same as when connected as in Fig. 2 to a 110 volt power source. In this way I have provided a system wherein both the motor and the relay as well as the overload can operate upon either voltage without any change.

For a particular ¼ horsepower capacitor start motor with which I am familiar, I prefer the capacitor 150 to have a capacitance of 120 microfarads and the capacitor 50 to have a capacitance of 80 microfarads. In general the capacitance of each should be increased or decreased for an increase or decrease in the size of the motor. This arrangement may also be used for capacitor start and run motors, in which case the permanent capacitor is connected across the terminals 39 and 110. The value of the capacitor 150 would be reduced according to the value of the permanent capacitor. The desirable capacitance of the capacitors in each case will also vary according to specific motor design.

In some cases, the capacitance of the capacitor 50 may be such as to make possible its use as a permanent capacitor. In such cases the conductor 114 may be connected to the terminal 69 instead of the terminal 61. This is shown in Figs. 4 and 5 which bear the same reference characters for corresponding parts in the other figures.

In some of the systems wherein this electric motor and control system is used it is often desired to use an electrically driven fan 118 preferably made to operate upon the lower voltage. This is readily done by connecting the conductors 120 and 122 of the fan motor 118 to the terminals 31 and 108 so that this fan motor 118 will receive 110 volts whether the system is connected to a 110 volt or a 220 volt power source.

While the form of embodiment of the invention as herein disclosed, constitutes a preferred form it is to be understood that other forms might be adopted, all coming within the scope of the claims which follow.

What is claimed is as follows:

1. An electric motor and control system comprising an electric motor having a phase winding and a main winding divided into separate portions, a first capacitor means connected in series with the phase winding, an overload control having an actuating element in series with one of the portions of the main winding for controlling the energization of the motor, a second capacitor means; electrical connecting means movable to one position for connecting separate portions of the main winding in parallel circuit arrangement with each other and with the phase winding and for connecting the second capacitor means in parallel circuit arrangement with the first capacitor means for operation upon a low voltage power source, and movable to another position for connecting one of said separate portions in parallel circuit arrangement with the phase winding and in series with another portion of the main winding and for connecting the second capacitor means to a point on the phase winding circuit between the first capacitor means and the phase winding to a point on the circuit between the portion of the main winding and the overload actuating element.

2. An electric motor and control system comprising an electric motor having a phase winding and a main winding divided into first and second portions, a first capacitor means connected in series with the phase winding, a starting control having an actuating element in series with the first portion of the main winding for controlling the energization of the phase winding, a second capacitor means, electrical connecting means movable to one position for connecting the first and second portions of the main winding in parallel circuit arrangement with each other and with the phase winding, and for connecting the second capacitor means in parallel circuit arrangement with the first capacitor means, and movable to another position for connecting said first portion of the main winding in parallel circuit arrangement with the phase winding and in series with the second portion of the main winding, and for connecting the second capacitor means to a point on the phase winding circuit between the first capacitor means and the phase winding and to a point upon the circuit portion between said first portion of the main winding and said starting relay actuating coil for operation upon a high voltage power source.

3. An electric motor and control system comprising an electric motor having a main winding divided into first and second portions and a phase winding, a starting control having an actuating element in series with the first main winding portion for controlling the deenergization of the phase winding, connecting means having one selective connection for connecting said first and second portions of the main winding in parallel circuit arrangement with each other and with the phase winding for operation upon one power source, said connecting means having a second selective connection for connecting said first portion of the main winding in parallel circuit relationship with the phase winding and in series circuit arrangement with the second portion of the main winding for operation upon different power source, a first capacitor means connected in series with the phase winding, and a second capacitor means connected when the second main winding portion is in series with the other winding portions to a point on the phase winding circuit between the first capacitor means and the phase winding and to a point on the circuit of the first main winding portion between said starting control actuating element and the first main winding portion.

4. An electric motor and control system comprising an electric motor having a main winding divided into first and second portions and a phase winding, a starting control having an actuating element in series with the first main winding portion for controlling the deenergization of the phase winding, connecting means having one selective connection for connecting said first and second portions of the main winding in parallel circuit arrangement with each other and with the phase winding for operation upon one power source, said connecting means having a second selective connection for connecting said first portion of the main winding in parallel circuit relationship with the phase winding and in series circuit arrangement with the second portion of the main winding for operation upon different power source, a first capacitor means connected in series with the phase winding, and a second capacitor means connected when the second main winding portion is in series with the other winding portion to a point on the phase winding circuit between the first capacitor means and the phase winding and to a point on the circuit of the first main winding portion between said starting control actuating element and the first main winding portion, said second capacitor means when the winding portions are in parallel circuit arrangement being connected in parallel circuit arrangement with the first capacitor means.

5. An electric motor and control system comprising an electric motor having a plurality of winding portions, means for connecting the winding portions in parallel electric circuit relation with each other for operation upon a low voltage power source and for connecting a first and a second winding portion in parallel with each other and in series relationship with a third winding portion for operation upon a higher voltage power source, a first capacitor means in series with said first winding portion, an overload control for deenergizing the electric motor upon the occurrence of an overload, said overload control having an actuating element in series with said second winding portion, a second capacitor means connected when the motor is connected to the higher voltage power source to a point on the circuit between said first capacitor means and said first winding portion and to a point on the circuit between said actuating element and said second winding portion.

6. An electric motor and control system comprising an electric motor having a first and a second winding portion connected in parallel with each other and in series relationship with a third winding portion, a first capacitor means in series with said first winding portion, a starting control for changing the energization of the first winding portion, said starting control having an actuating element in series with said second winding portion, a second capacitor means connected to a point on the circuit between the first capacitor means and said first winding portion and to a point on the circuit between said actuating element and said second winding portion.

7. An electric motor and control system comprising an electric motor having a first and a second winding portion connected in parallel with each other and in series relationship with a third winding portion, a capacitor means in series with said first winding portion, a starting control for changing the energization of the first winding portion, said starting control having an actuating element in series with said second winding portion, impedance means connected to a point on the circuit between the capacitor means and said first winding portion and to a point on the circuit between said actuating element and said second winding portion.

8. An electric motor and control system comprising an electric motor having a plurality of winding portions connectible into parallel electric circuit relation with each other for operation upon a low voltage power source and connectible to place the first and a second winding portion in parallel with each other and in series relationship with a third winding portion for operation upon a higher voltage power source, a starting control for changing the energization of the said first winding portion at the end of the starting period, said starting control having an actuating element in series with said second winding portion, a first capacitor means in series with said second winding portion, and a second capacitor means connected when the motor is connected to the higher voltage power source to a point on the circuit between said first capacitor means and said first winding portion, and to a point on the circuit between said actuating element and said second winding portion.

HARRY F. CLARK.